United States Patent
Kawata et al.

(10) Patent No.: US 9,582,088 B2
(45) Date of Patent: Feb. 28, 2017

(54) MICROSCOPE

(75) Inventors: Satoshi Kawata, Osaka (JP); Minoru Kobayashi, Osaka (JP); Taisuke Ota, Osaka (JP); Tomoya Uchiyama, Osaka (JP); Naoyoshi Kubota, Osaka (JP); Shogo Kawano, Osaka (JP)

(73) Assignee: NANOPHOTON CORPORATION, Osaka (JP)

( * ) Notice: Subject to any disclaimer, the term of this patent is extended or adjusted under 35 U.S.C. 154(b) by 611 days.

(21) Appl. No.: 14/006,500

(22) PCT Filed: Mar. 22, 2012

(86) PCT No.: PCT/JP2012/057277
§ 371 (c)(1),
(2), (4) Date: Nov. 8, 2013

(87) PCT Pub. No.: WO2012/128305
PCT Pub. Date: Sep. 27, 2012

(65) Prior Publication Data
US 2014/0063226 A1 Mar. 6, 2014

(30) Foreign Application Priority Data
Mar. 23, 2011 (JP) .................... 2011-064256

(51) Int. Cl.
*H04N 7/18* (2006.01)
*H04N 9/47* (2006.01)
(Continued)

(52) U.S. Cl.
CPC ............ *G06F 3/041* (2013.01); *G02B 21/36* (2013.01); *H04N 7/18* (2013.01)

(58) Field of Classification Search
CPC ............ G06F 3/041; G02B 21/36; H04N 7/18
(Continued)

(56) References Cited

U.S. PATENT DOCUMENTS

2007/0132994 A1  6/2007  Kobayashi et al.
2008/0231610 A1* 9/2008  Hotelling ............ G06F 3/0418
                                           345/173
(Continued)

FOREIGN PATENT DOCUMENTS

EP     2 108 328 A1   10/2009
EP     2 275 852 A2    1/2011
(Continued)

OTHER PUBLICATIONS

International Search Report for PCT/JP2012/057277 mailed Jun. 19, 2012 (in English).
(Continued)

*Primary Examiner* — Andy Rao
*Assistant Examiner* — Jared Walker
(74) *Attorney, Agent, or Firm* — Smith, Gambrell & Russell, LLP.

(57) ABSTRACT

A touch screen (60) disposed on a display surface of a display means (58) is used as an inputting means so that a variety of actions of a microscope can be controlled with sufficient ease and precision.

A variety of actions are controlled based on an operator's various finger gestures used on the touch screen disposed on the display surface of the display means, for example, making contact by a finger (tap), making two consecutive contacts by a finger (double-tap), making contact by a finger, and moving the finger without releasing it (drag), making contact by a finger and maintaining the contact for a predetermined time or longer (touch-and-hold), making simultaneous contact by two fingers, and increasing spacing between the fingers (pinch-out) or decreasing the spacing (pinch-in), and making simultaneous contact by two fingers, and moving the fingers in parallel (double-drag).

15 Claims, 9 Drawing Sheets

(51) Int. Cl.
*G06F 3/041* (2006.01)
*G02B 21/36* (2006.01)

(58) Field of Classification Search
USPC .................................................. 348/79, 80
See application file for complete search history.

(56) References Cited

U.S. PATENT DOCUMENTS

| | | |
|---|---|---|
| 2009/0138800 A1 | 5/2009 | Anderson et al. |
| 2009/0259960 A1 | 10/2009 | Steinle et al. |
| 2010/0110422 A1* | 5/2010 | Dennis ................. G01J 3/02 356/301 |
| 2010/0141752 A1* | 6/2010 | Yamada ............... G01N 1/312 348/79 |
| 2010/0313125 A1* | 12/2010 | Fleizach ........... G06F 3/04883 715/702 |
| 2012/0120224 A1 | 5/2012 | Zuest et al. |

FOREIGN PATENT DOCUMENTS

| | | |
|---|---|---|
| EP | 2 339 388 A1 | 6/2011 |
| JP | 8-223563 A | 8/1996 |
| JP | 9-197287 A | 7/1997 |
| JP | 2001-59940 A | 3/2001 |
| JP | 2012-108511 A | 6/2012 |

OTHER PUBLICATIONS

Extended European Search Report for Application No. PCT/JP2012/057277, dated Aug. 29, 2014.

* cited by examiner

( α IS DETERMINED BY DIMENSIONS OF IMAGE ON DISPLAY SURFACE)

Fig. 10

| B1 | B2 | B3 |
|----|----|----|
| B4 | A  | B5 |
| B6 | B7 | B8 |

MICROSCOPE

TECHNICAL FIELD

This invention relates to a microscope having a touch screen disposed on a display surface of a display means.

BACKGROUND ART

A typical example of a microscope, such as a Raman microscope, is equipped with a sample stage mounted to be movable in an X-direction and a Y-direction, an X-/Y-directionally driving means for driving the sample stage in the X-direction and the Y-direction, a revolver including a plurality of objective lenses having different magnifications, a Z-directionally driving means for moving the sample stage and the revolver relatively in a Z-direction, a revolver driving means for positioning any one of the plurality of objective lenses selectively at a working position opposing the sample stage, an image pickup means such as a CCD camera, an image projecting optical means for projecting an image of a sample located on the sample stage onto the image pickup means through the objective lens positioned at the working position, a display means such as a liquid crystal panel, and a control means. With such a microscope, it is necessary to appropriately perform control operations, such as the selection of an observation or measurement region of the sample placed on the sample stage, the selection of an observing or measuring magnification, and the focusing of the objective lens. Normally, these control operations are performed via an inputting means such as a joystick or a trackball. However, the control operation using such an inputting means is not necessarily easy, but requires considerable skill, for example, because of a time lag which exists between an inputting operation and an outputted action such as the movement of the sample stage. In making an observation or measurement at a high magnification, in particular, it is common practice to set an observation or measurement region roughly on a low magnification screen, and then set an observation or measurement region fully precisely at a high magnification. In changing the magnification, however, there is need to replace the objective lens and carry out focusing. This procedure is considerably complicated.

Patent Documents 1 and 2 to be indicated below, on the other hand, each disclose a microscope which has a touch screen disposed on a display surface of a display means such as a liquid crystal panel, and uses such a touch screen as an inputting means. However, the microscopes disclosed in the Patent Documents 1 and 2 pose, for example, the following problems: (i) The manner of action control in each of these microscopes is based on contact of a finger with various function switches defined on the touch screen, or mere movement of a finger, and control operations are limited. (ii) An image of a sample on a sample stage, which is projected onto an image pickup means via an image projecting optical system, is displayed on the display means. However, a considerable time lag exists between an inputting operation and completion of the movement of the sample stage and, in moving the sample stage over a considerable length, it is necessary to repeat the designation of a region and a wait for the completion of movement of the sample stage. (iii) When an objective lens has been replaced, it is necessary to correct an error in the parfocal distance for the objective lens and an error in the center of the field of view. However, correction of such errors has not been taken into consideration. (iv) No consideration has been given to the setting of a measurement region required for a Raman microscope.

PRIOR ART DOCUMENTS

Patent Documents

Patent Document 1: JP-A-9-197287
Patent Document 2: JP-A-2001-59940

SUMMARY OF THE INVENTION

Problems to be Solved by the Invention

The present invention has been accomplished in the light of the above facts. A major technical challenge to the invention is to provide a novel and improved microscope which enables various actions thereof to be controlled with sufficient ease and precision by use of a touch screen disposed on a display surface of a display means as an inputting means.

Means for Solving the Problems

The present inventors have conducted in-depth studies. As a result, they have found that the above-mentioned major technical challenge can be solved by controlling a variety of actions based on a variety of finger gestures of an operator used on a touch screen disposed on a display surface of a display means, for example, contact by a finger ("tap"), two consecutive contacts by a finger ("double-tap"), contact by a finger, followed by its movement without its release from the touch screen ("drag"), prolonged contact by a finger for a predetermined period of time or longer ("touch-and-hold"), simultaneous contact by two fingers, followed by spreading them apart ("pinch-out") or bringing them close to each other ("pinch-in"), and simultaneous contact by two fingers, followed by moving them in parallel ("double-drag").

That is, according to the present invention, there is provided, as a microscope for solving the above major technical challenge, a microscope comprising: a sample stage mounted to be movable in an X-direction and a Y-direction; X-/Y-directionally driving means for driving the sample stage in the X-direction and the Y-direction; a revolver including a plurality of objective lenses having different magnifications; Z-directionally driving means for moving the sample stage and the revolver relatively in a Z-direction; revolver driving means for positioning any one of the plurality of objective lenses selectively at a working position opposing the sample stage; image pickup means; image projecting optical means for projecting an image of a sample located on the sample stage onto the image pickup means through the objective lens positioned at the working position; display means; a touch screen disposed on a display surface of the display means; and control means, wherein the control means controls the action of the X-/Y-directionally driving means, the action of the Z-directionally driving means, the action of the revolver driving means, and the display magnification in the display means, in accordance with an operator's finger gestures used on the touch screen.

Preferably, when a finger is contacted with the touch screen, the control device stores an image signal from the image pickup means into a built-in memory, and allows a memory image based on the stored image signal to be displayed on the display surface of the display means; and when the finger is moved without being released from the touch screen, the control means moves the memory image on the display surface of the display means in accordance with the movement of the finger, and allows the X-/Y-directionally driving means to act, thereby moving the sample stage in the X- and/or Y-direction. During a period from contact of the finger with the touch screen until release of the finger from the touch screen, the control means preferably detects the movement of the finger at predetermined time intervals to update the memory image based on the positions of the finger. When the movement of the finger is stopped, and the finger is released from the touch screen, to terminate the movement of the sample stage, then the control means preferably renders the image displayed on the display surface of the display means a real-time image projected onto the image pickup means.

Upon simultaneous contact of two fingers with the touch screen, the control means preferably stores the spacing between the two fingers. When the spacing between the two fingers is changed without release of the two fingers from the touch screen, the control means preferably changes the magnification of the image displayed on the display surface of the display means in accordance with the change rate of the spacing between the two fingers. Preferably, when the change rate of the spacing between the two fingers exceeds a predetermined threshold value, the control means allows the revolver driving means to act, thereby replacing the objective lens located at the working position opposing the sample stage. In starting the action of the revolver driving means, the control means advantageously stores an image signal from the image pickup means into the built-in memory and, during the action of the revolver driving means, allows a memory image based on the image signal stored in the built-in memory to be displayed on the display surface of the display means at a magnification conformed to the change rate for the two fingers. Preferably, upon termination of replacement of the objective lens, the control means allows the X-/Y-directionally driving means and/or the Z-directionally driving means to act, for adjustment of focus, based on information on the parfocal distance for the objective lens and the position of the center of the field of view prestored in the built-in memory, and then renders the image displayed on the display surface of the display means a real-time image projected onto the image pickup means.

Preferably, when an image displayed on the display surface of the display means is reduced after the objective lens of the lowest magnification is located at the working position, the control means permits display of a wide-field buffer image composed of a real-time image on the display surface of the display means and an additional image added in succession to the real-time image in a region outward of the real-time image. When the additional image is not stored in the built-in memory, the control means preferably allows the X-/Y-directionally driving means to act, thereby moving the sample stage in the X- and Y-direction to store a required additional image signal into the built-in memory, and then returning the sample stage to the initial position. Upon contact of a finger with the touch screen, with the wide-field buffer image being displayed on the display surface of the display means, the control device preferably stores the wide-field buffer image signal into the built-in memory. When the finger is moved without being released from the touch screen, the control means preferably moves the wide-field buffer image on the display surface of the display means in accordance with the movement of the finger, and allows the X-/Y-directionally driving means to act, thereby moving the sample stage in the X- and/or Y-direction.

Preferably, when a finger is contacted with a same position of the touch screen twice consecutively, the control means allows the Z-directionally driving means to act based on a contrast at the same position contacted and its neighborhood to carry out focusing of the objective lens positioned at the working position with respect to the sample placed on the sample table.

In the case of a Raman microscope, when a specific gesture of the operator's finger is used on the touch screen, the control means preferably sets the microscope in a Raman measurement region setting mode. Advantageously, the specific gesture is to contact the finger with the touch screen and maintain the contact for a predetermined time, and the control means sets the site of contact by the finger as a measurement region. When, after setting in the measurement region setting mode, the finger in contact with the touch screen is moved without being released from the touch screen, the control means preferably sets a measurement region in accordance with the movement of the finger.

When two fingers are simultaneously contacted with the touch screen, and moved in parallel without being released from the touch screen, the control means preferably allows the Z-directionally driving means to act in accordance with the amount of parallel movement of the two fingers, thereby moving the sample stage relative to the revolver in the Z-direction. Preferably, when the two fingers are moved in parallel in a predetermined direction, the control means moves the sample stage relatively toward the revolver; and when the two fingers are moved in parallel in the opposite direction, the control means moves the sample stage away from the revolver. When the two fingers are simultaneously contacted with the touch screen, and moved in parallel without being released from the touch screen, the control means advantageously displays on the display means a scale and a sample stage mark for showing the relative position of the sample stage with respect to the revolver, and moves the sample stage mark along the scale in accordance with the relative movement of the sample stage with respect to the revolver. The scale and the sample stage mark are displayed for a predetermined period of time and, when a finger is contacted with the sample stage mark and moved along the scale during display of the scale and the sample stage mark, the sample stage is preferably moved relative to the revolver in accordance with the movement of the finger.

While the touch screen is making a wireless connection to the control means, if the sample stage approaches the revolver beyond a predetermined distance when the wireless connection is cut against a user's intention, the control means preferably allows the Z-directionally driving means to act, thereby moving the sample stage relatively to a position separated from the revolver by the predetermined distance. In the microscope provided with a laser light source, while the touch screen is making a wireless connection to the control means, if the laser light source is energized when the wireless connection is cut against the user's intention, the control means advantageously deenergizes the laser light source.

Effects of the Invention

According to the microscope of the present invention, various finger gestures used on the touch screen disposed on the display surface of the display means are detected, and various actions are controlled in accordance with the gestures, so that various actions of the microscope are controlled with sufficient ease and precision.

MODE FOR CARRYING OUT THE INVENTION

Figure 1:
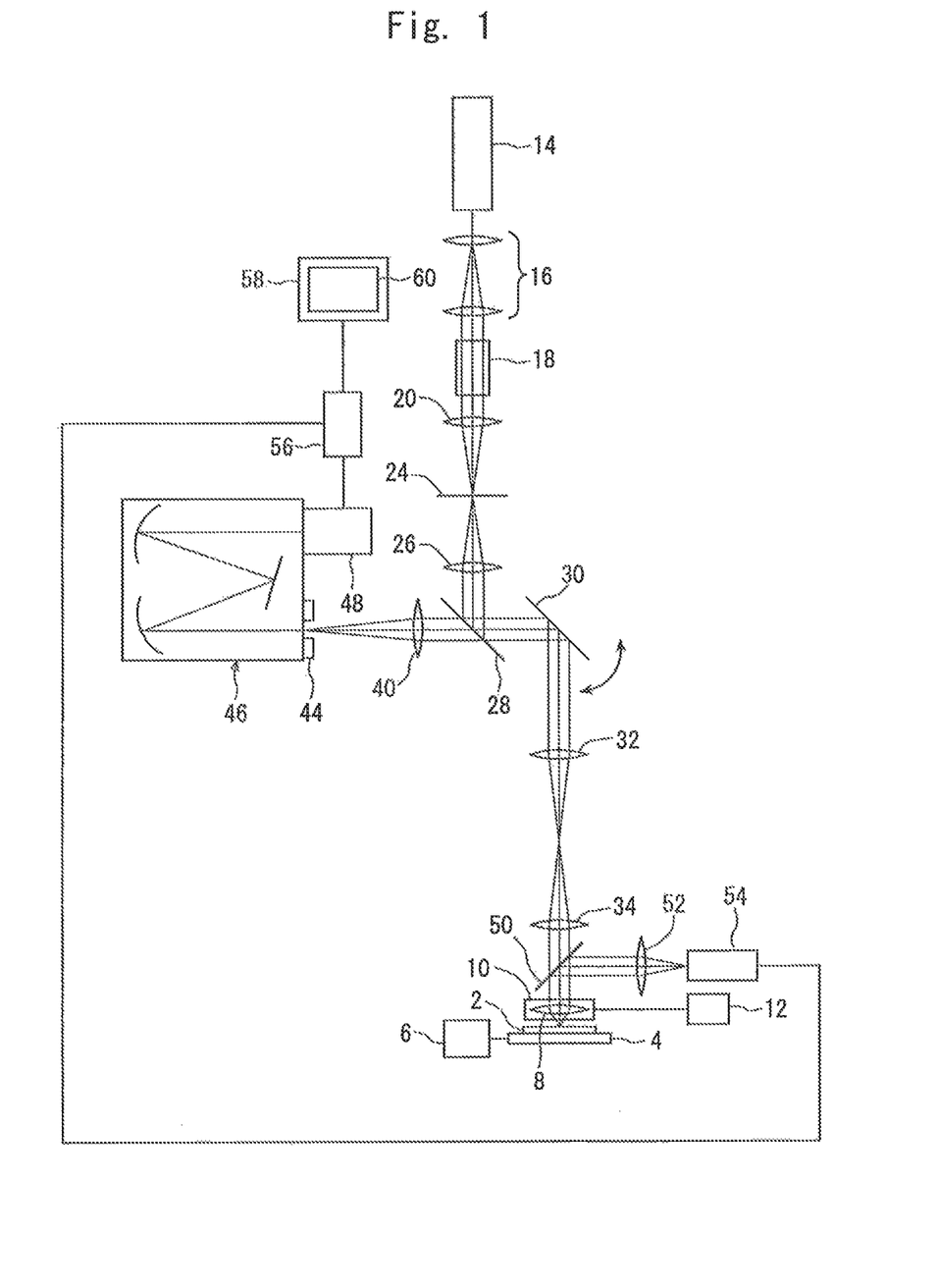
FIG. 1 is a schematic block diagram showing a preferred embodiment of a microscope constituted in accordance with the present invention.

FIG. 1 briefly illustrates essential constituents of a Raman microscope constituted in accordance with the present invention. The illustrated Raman microscope includes a sample stage 4 for bearing a sample 2. The sample stage 4 is mounted to be movable in an X-direction (lateral direction in FIG. 1), in a Y-direction (direction perpendicular to the sheet face in FIG. 1), and in a Z-direction (vertical direction in FIG. 1). A driving means 6 is annexed to the sample stage 4, and the action of the driving means 6 moves the sample stage 4 in the X-direction, the Y-direction and the Z-direction, as appropriate. Thus, the driving means 6 constitutes an X-/Y-directionally driving means for driving the sample stage 4 in the X-direction and the Y-direction, and also constitutes a Z-directionally driving means for driving the sample stage 4 in the Z-direction.

A revolver 10 is rotatably mounted above the sample stage 4. A plurality of objective lenses 8 of different magnifications, for example, four objective lenses 8 having magnifications of 5, 10, 20 and 50, are provided on the revolver 10 (only one of the objective lenses is shown in FIG. 1). A revolver driving means 12 is annexed to the revolver 10, and the revolver 10 is appropriately rotated by the revolver driving means 12, whereby a predetermined one of the plurality of objective lenses 8 is positioned at a working position opposing the sample stage 4. In the illustrated embodiment, the sample stage 4 is appropriately moved in the Z-direction, as stated above, so that a Z-directional spacing between the objective lens 8 and the sample 2 on the sample stage 4 is set at an appropriate value. If desired, instead of, or in addition to, moving the sample stage 4 in the Z-direction, the revolver 10 is appropriately moved in the Z-direction, whereby the Z-directional spacing between the objective lens 8 and the sample 2 on the sample stage 4 can be set at an appropriate value.

In the illustrated Raman microscope, there are disposed a laser light source 14, a beam expander 16, a Y-directionally operating means 18, a lens 20, a diaphragm 24, a lens 26, a beam splitter 28, an X-directionally operating mirror 30, a lens 32, a lens 34, a lens 40, a spectroscope 46 having an entrance slit 44, and a Raman signal detector 48 which can be constituted by a CCD camera. The concrete configurations and actions of these constituents in the illustrated Raman microscope are disclosed in detail in the specification and drawings (FIG. 1, in particular) of JP-A-2007-179002, and thus their explanations are omitted herein by referring them to these disclosures.

With further reference to FIG. 1, a beam splitter 50 is disposed between the lens 40 and the revolver 10, and a lens 52 and an image pickup means 54 are disposed in relation to the beam splitter 50. The beam splitter 50 and the lens 52 constitute an image projecting optical means which projects an image of the sample 2 on the sample stage 4 onto the image pickup means 54 via the objective lens 8 positioned at the working position. The image pickup means 54 can be composed of a CCD camera. The image pickup means 54 is connected to a control means 56 along with the Raman signal detector 48. A display means 58 is annexed to the control means 56 which can be composed of a computer incorporating a memory. The display means 58 can be composed of a suitable display such as a liquid crystal panel. It is important that a touch screen 60 which senses contact by an operator's finger be disposed on the display surface of the display means 58.

Figure 2:
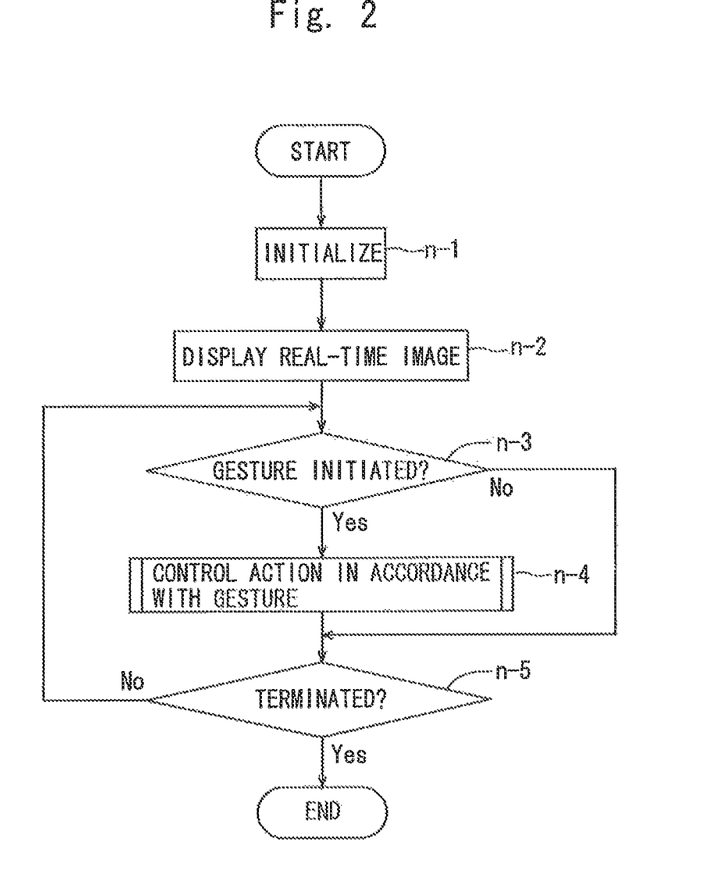
FIG. 2 is a flowchart showing the basic manner of action control in the microscope illustrated in FIG. 1.

In the microscope constituted in accordance with the present invention, it is important for the control means 56 to control various actions of the microscope in accordance with the operator's finger gestures used on the touch screen 60, as will be described in detail below. Transmission and reception of signals between the control means 56 and the various constituents of the microscope can be performed via suitable signal wires. If desired, transmission and reception of signals can be performed wirelessly. With further reference to a flowchart shown in FIG. 2 along with FIG. 1, when the action of the microscope is started by turning the power on, initialization is executed in step n-1, whereby the microscope is brought into a preset initial state. Then, in step n-2, an image projected onto the image pickup means 54, namely, a real-time image, is displayed on the display surface of the display means 58. In step n-3, it is determined whether the operator's finger gesture has been used on the touch screen 60. If the operator's finger gesture has been used, the program shifts to step n-4 to carry out action control conformed to the gesture in a manner to be described in detail later. In step n-5, it is determined whether the action control conformed to the gesture has been completed.

Next, the action control conformed to the gesture will be described in detail. The term "total magnification", a magnification at which the sample on the sample stage 4 is displayed on the display surface of the display means 58, is represented by the following equation:

Total magnification=(magnification of objective lens 8)×(magnification of image projecting optical means)×(digital zoom magnification)×(ratio between dimensions of image region of image pickup means 54 and dimensions of display surface of display means 58)

The term "digital zoom magnification" refers to the ratio between the entire image from the image pickup means 54 and a portion actually displayed on the display surface of the display means 58. When this magnification is 1, the entire image from the image pickup means 54 is displayed. At the magnification of greater than 1, a part of the image from the image pickup means 54 is enlarged, and the enlarged image is displayed on the display surface of the display means 58. At the magnification of less than 1, the image from the image pickup means 54 is smaller than the display surface of the display means 58.

Figure 3:
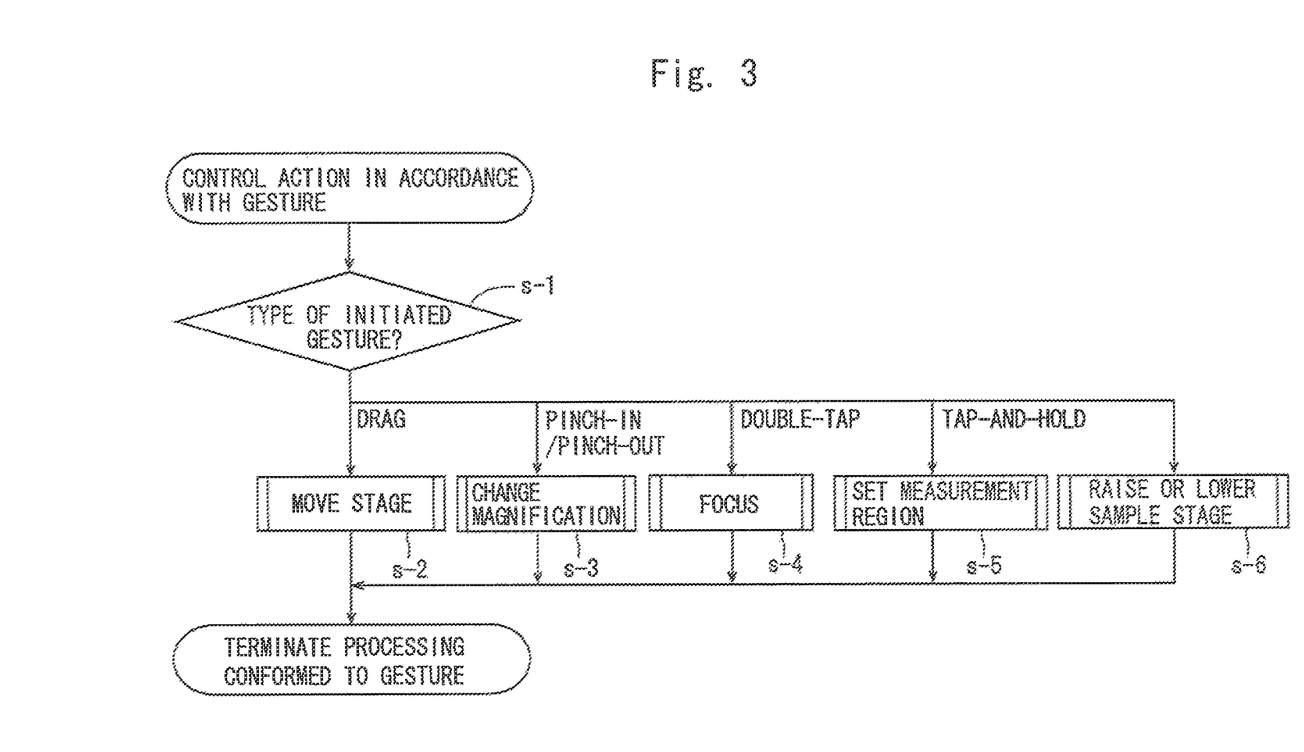
FIG. 3 is a flowchart showing the manners of action control in accordance with finger gestures in the microscope illustrated in FIG. 1.

With further reference to a flowchart shown in FIG. 3 along with FIG. 1, the gesture used on the tough screen 60 is discriminated in step s-1. If the gesture is a drag, the program shifts to step s-2 to move the sample stage 4. If the gesture is a pinch-in or a pinch-out, the program shifts to step s-3 to effect a change in the magnification. If the gesture is a double-tap, the program shifts to step S-4 to carry out focusing (autofocusing) of the objective lens 8. If the gesture is a tap-and-hold, the program shifts to step S-5 to perform setting of a measurement region. If the gesture is a double-drag, the program shifts to step s-6 to raise or lower the sample stage.

Figure 4:
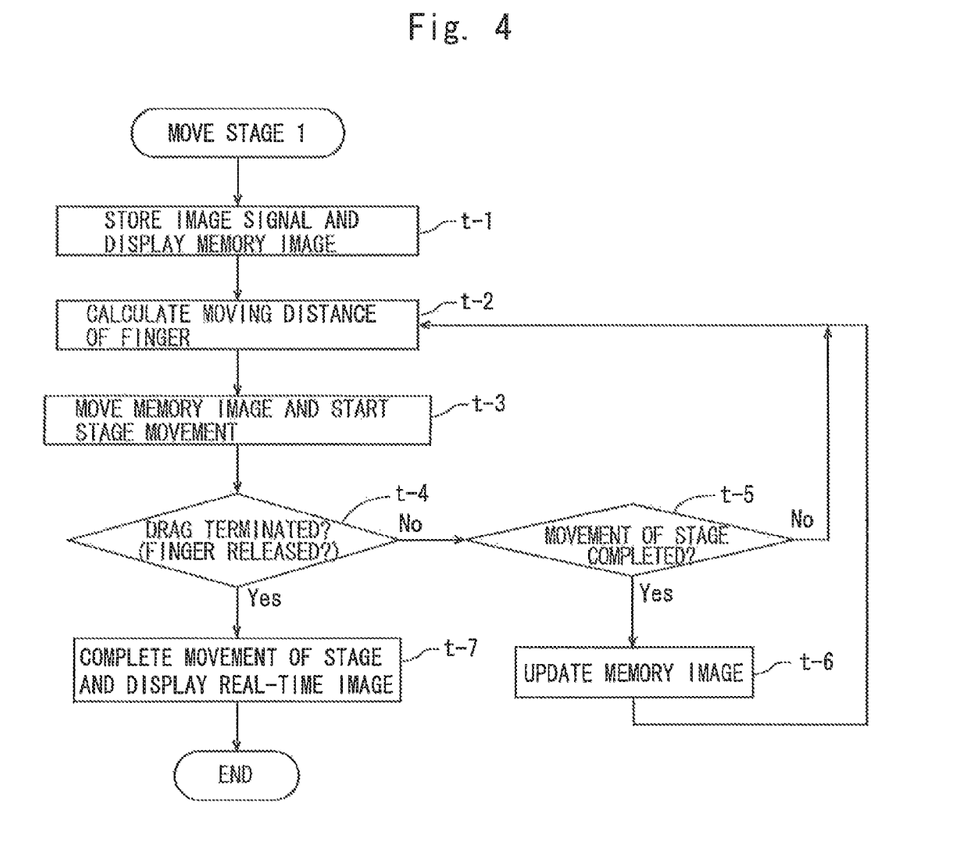
FIG. 4 is a flowchart showing the manners of moving a sample stage and updating an image in the microscope illustrated in FIG. 1.

The movement of the sample stage 4 will be explained by reference to a flowchart shown in FIG. 4 along with FIG. 1. When the digital zoom magnification is 1 or more, step t-1 is executed so that the image signal from the image pickup means 54 is stored in the built-in memory of the control means 56, and the memory image based on the stored image signal is displayed on the display surface of the display means 58. Then, the program shifts to step t-2 to calculate the distance over which the finger has been moved. In step t-3, the memory image displayed on the display surface of the display means 58 is moved by the moving distance of the finger, and the movement of the sample stage 4 is started. Then, the program shifts to step t-4 to determine whether the finger has been released from the touch screen 60, namely, whether the drag has been terminated. If the drag has not been terminated, the program shifts to step t-5 to determine whether the sample stage 4 has been moved over the distance corresponding to the moving distance of the finger. If the required movement of the sample stage 4 has not been completed, the program returns to the above-mentioned step t-2. In this manner, the moving distance of the finger is detected repeatedly at predetermined time intervals, without a wait for completion of the movement of the sample stage 4, to update the moving distance of the sample stage 4. In comparison with a case where after a wait for completion of the movement of the sample stage 4, next movement is started (the case disclosed in the Patent Documents 1 and 2), therefore, it is possible to move the sample stage 4 continuously, without a waiting time, and look for the site of measurement of the sample promptly. Upon completion of the required movement of the sample stage 4, the program shifts to step t-6 to update the image signal stored in the built-in memory of the control means 56 to the image signal from the image pickup means 54. Thus, the image signal stored in the built-in memory is also updated at intervals of a predetermined time. Upon termination of the drag in the above step t-4, the program shifts to step t-7 in which after the sample stage 4 is moved over the distance corresponding to the moving distance of the finger, the image displayed on the display surface of the display means 58 is switched from the memory image to the real-time image. If desired, in moving the sample stage 4, instead of switching the image displayed on the display surface of the display means 58 from the real-time image to the memory image, it is possible to display the memory image, superposed on the real-time image, in a semitransparent state, for example.

Figure 5:
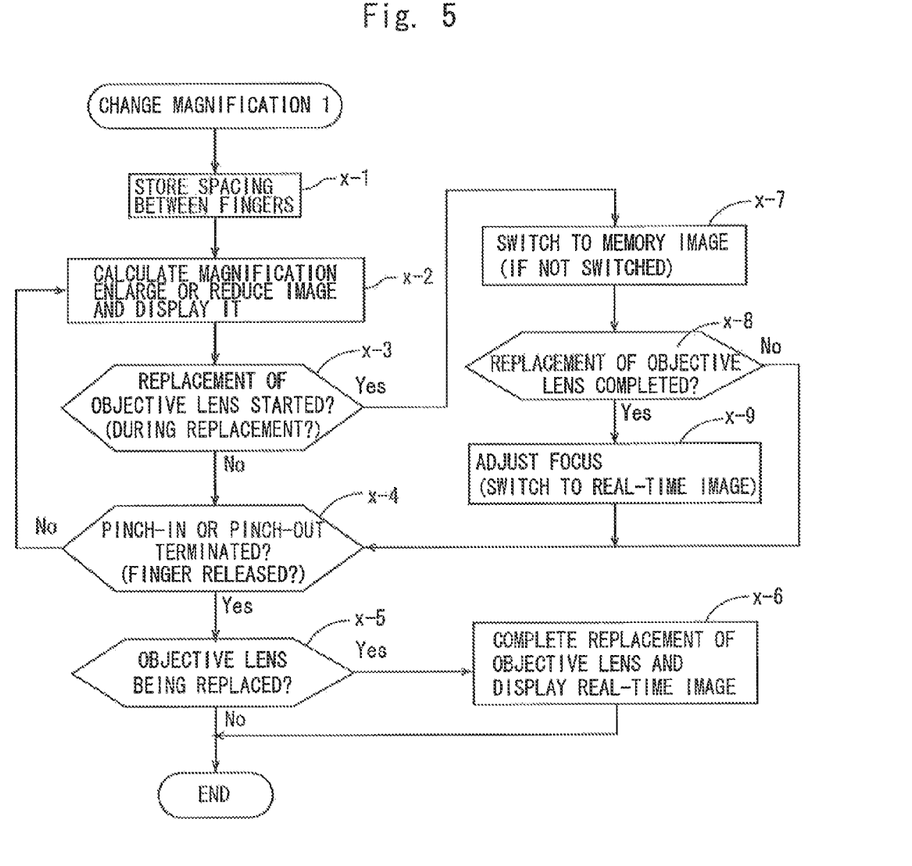
FIG. 5 is a flowchart showing the manner of changing a magnification in the microscope illustrated in FIG. 1.
Figure 6:
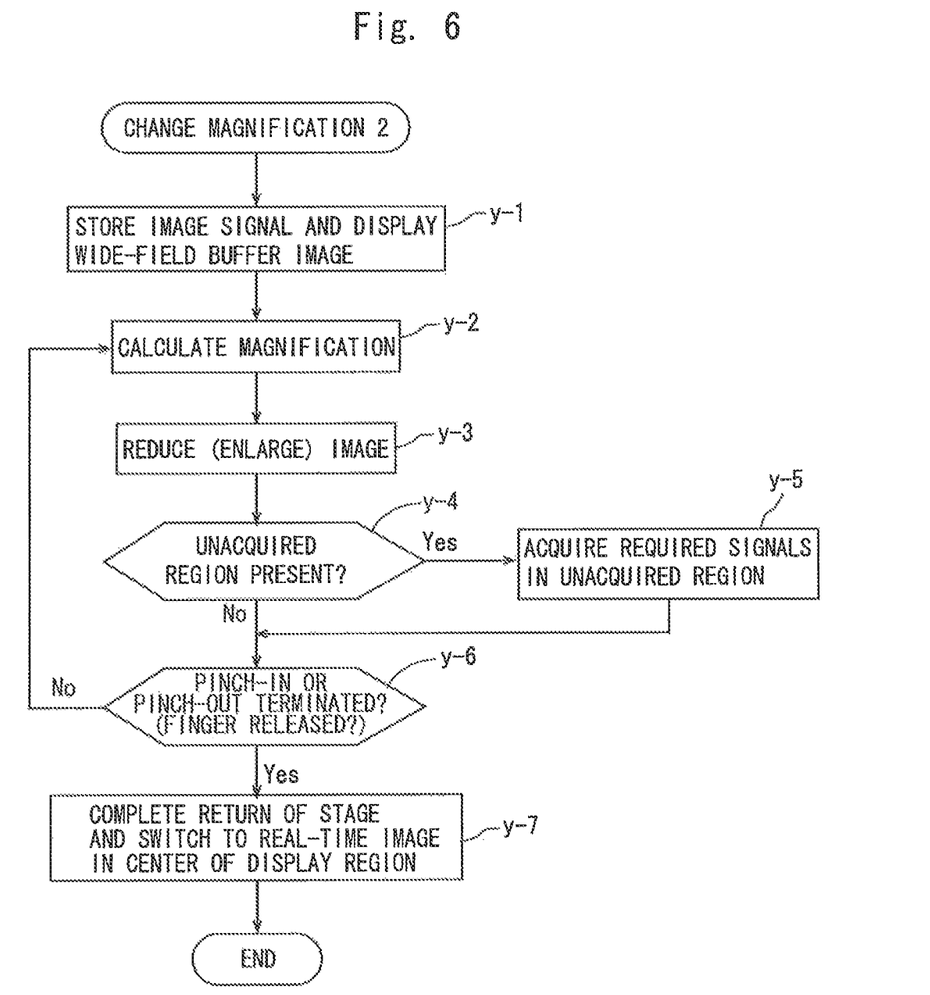
FIG. 6 is a flowchart showing the manner of changing the magnification (when the digital zoom magnification is lower than 1) in the microscope illustrated in FIG. 1.
Figure 9:
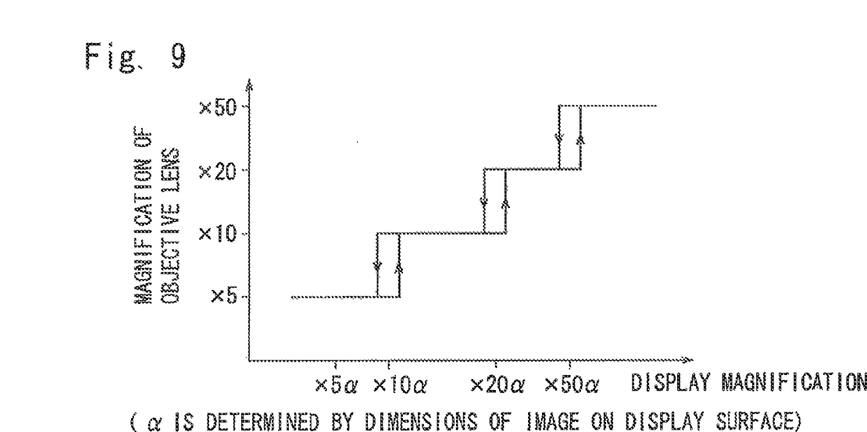
FIG. 9 is a graph showing the relation between changes in the magnification and replacement of an objective lens.

The manner of changing the magnification will be described with reference to FIG. 5 along with FIG. 1. In step x-1, spacing between two fingers contacted with the touch screen 60 is stored. Then, the program shifts to step x-2, whereupon if the spacing between the two fingers is changed (pinch-in or pinch-out), the rate of a decrease or an increase in the spacing is calculated, the image signal from the image pickup means 54 is reduced or enlarged in accordance with the calculated rate of decrease or increase, and the reduced or enlarged image is displayed on the display surface of the display means 58. When the decrease or increase rate exceeds a threshold, rotation of the revolver 10 is initiated to start the replacement of the objective lens 8 positioned at the working position. For the threshold concerned with the replacement of the objective lens 8, it is desirable to impart hysteresis, as shown in FIG. 9, thereby avoiding the frequent replacement of the objective lens 8 due to vibrations of the finger or a noise in the readout of the finger position. When the objective lens 8 at the working position has the lowest magnification and the digital zoom magnification is less than 1, action control complying with a flowchart shown in FIG. 6 is exercised (this action control will be described later). In step x-3, it is determined whether the replacement of the objective lens 8 has been started. If the replacement of the objective lens 8 has not been started, the program shifts to step x-4 to determine whether the pinch-in or pinch-out has been terminated and the two fingers have been released from the touch screen 60. If the pinch-in or pinch-out has not been terminated, the program returns to the above step x-2. Upon termination of the pinch-in or pinch-out, resulting in the release of the two fingers from the touch screen 60, the program shifts to step x-5 to determine whether the objective lens 8 is being replaced. If the replacement of the objective lens 8 is under way, the program shifts to step x-6 to switch the image displayed on the display surface of the display means 58 to the real-time image after completion of the replacement of the objective lens 8. If the replacement of the objective lens 8 is started in the above step x-3, the program shifts to step x-7 to store the image signal from the image pickup means 54, present at the start of replacement of the objective lens 8, into the built-in memory of the control means 56. If the image displayed on the display surface of the display means 58 has not been switched to a memory image, this image is switched to the memory image. During replacement of the objective lens 8, therefore, the memory image is displayed, digitally zoomed, on the display surface of the display means 58. Then, the program shifts to step x-8 to determine whether the replacement of the objective lens 8 has been completed. If the replacement of the objective lens 8 has not been completed, the program shifts to the above step x-4. If the replacement of the objective lens 8 has been completed, the program shifts to step x-9. In the step x-9, the sample stage 4 is moved in the Z-direction and the X- and Y-direction for focusing, based on the error in the parfocal distance for the objective lens and the error in the position of the center of the field of view which have been prestored in the built-in memory of the control means 56, and also the image on the display surface of the display means 58 is switched to the real-time image. Then, the program shifts to the above step x-4.

Figure 10:
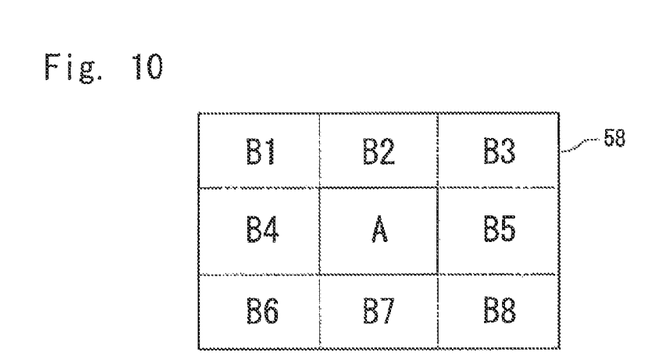
FIG. 10 is a schematic diagram showing an example of a wide-field buffer image displayed on a display means in the microscope of FIG. 1.

When the digital zoom magnification is less than 1, a change in the magnification will be made in the following manner: If, after replacement with the objective lens 8 of the lowest magnification by reduction due to a pinch-in, a further reduction by a pinch-in is executed, the dimensions of the image attributed to the image signal from the image pickup means 54 become smaller than the dimensions of the display surface of the display means 58. In this case, a wide-field buffer image comprising required additional images B1 to B8 added to the region outward of a display image A based on the image signal from the image pickup means 54 is displayed on the display surface of the display means 58, as illustrated in FIG. 10. With further reference to a flowchart shown in FIG. 6 along with FIG. 1, if a further reduction by a pinch-in is performed after replacement with the objective lens 8 of the lowest magnification, step y-1 is executed, whereby the image signal from the image pickup means 54 is stored in the built-in memory of the control means 56, display of the real-time image is suspended, and the image displayed on the display surface of the display means 58 is switched to the wide-field buffer image (namely, an image comprising the real-time image and the additional image adjacent to and surrounding the real-time image). In the wide-field buffer image, the memory image is displayed in the center, and the site in the surrounding region where no additional image signal has been acquired is displayed, for example, in a grey color. Then, the program shifts to step y-2 to calculate the reduction rate (or enlargement rate) of the image by a pinch-in (or a punch-out in a state where the digital zoom magnification is already smaller than 1) in the same manner as stated above. In step y-3, the memory image is displayed on a reduced scale at the required reduction rate (or on an enlarged scale at the required enlargement rate). In step y-4, it is determined whether there is a region where an additional image to be displayed around the memory image has not been acquired. In the presence of such an unacquired region, the program shifts to step y-5. In the step y-5, the sample stage 4 is appropriately moved so that the image in the region adjacent to the memory image is projected onto the image pickup means 54, whereupon an additional image signal from the image pickup means 54 is stored, and the stored memory additional image is displayed at the required site on the display surface of the display means 58. Such actions are repeatedly performed for all additional images needed for the surroundings of the memory image at the center, whereby a wide-field buffer image is displayed on the display surface of the display means 58. Upon completion of the acquisition of necessary additional image signals, namely, in the absence of regions where the necessary additional image signals have not been acquired, the program shifts to step y-6 to determine whether the pinch-in (or pinch-out) has been terminated, that is, whether the two fingers have been released from the touch screen 60. If the pinch-in (or pinch-out) has not been terminated, the program returns to the above step y-2. If the pinch-in (or pinch-out) has been terminated, the program shifts to step y-7. In the step y-7, the sample stage 4 is returned to a state where the memory image is located at the center of the display surface of the display means 58 and, after completion of the return of the sample stage 4, the image in the central region of the wide-field image is switched to the real-time image.

Figure 7:
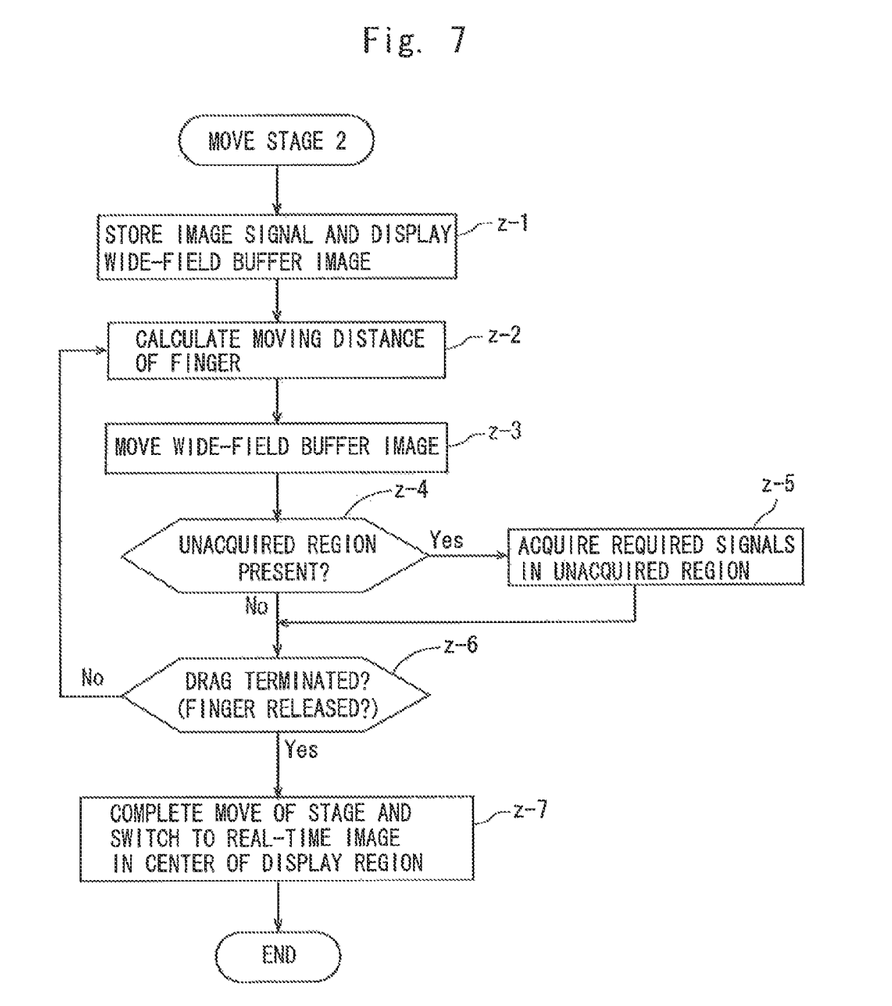
FIG. 7 is a flowchart showing the manners of moving the sample stage and updating the image (when the digital zoom magnification is lower than 1) in the microscope illustrated in FIG. 1.

Next, the manner of moving the sample stage when the digital zoom magnification is smaller than 1 will be explained with reference to FIG. 7 along with FIG. 1. When a finger is contacted with the touch screen 60, the procedure for movement of the sample stage 4 is started. In step z-1, the image signal from the image pickup means 54 is stored into the built-in memory of the control means 56, display of the real-time image is suspended, and the image displayed on the display surface of the display means 58 is switched to a wide-field buffer image. In step z-2, the moving distance of the finger is calculated. In step z-3, the wide-field buffer image is moved in accordance with the moving distance of the finger. In step z-4, it is determined whether there is a region where an additional image to be displayed around the memory image has not been acquired. In the presence of such an unacquired region, the program shifts to step z-5. In the step z-5, the sample stage 4 is appropriately moved so that the image in the region adjacent to the memory image is projected onto the image pickup means 54, whereupon an additional image signal from the image pickup means 54 is stored, and the stored memory additional image is displayed at the required site on the display surface of the display means 58. Such actions are repeatedly performed for all additional images needed for the surroundings of the memory image at the center, whereby a wide-field buffer image is displayed on the display surface of the display means 58. Upon completion of the acquisition of necessary additional image signals, namely, in the absence of regions where the necessary additional image signals have not been acquired, the program shifts to step z-6 to determine whether the finger has been released from the touch screen 60, that is, whether the drag has been terminated. If the drag has not been terminated, the program returns to the above step z-2. If the drag has been terminated, the program shifts to step z-7. In the step z-7, the sample stage 4 is moved to a state where the image from the image pickup means 54 is located at the center of the display surface of the display means 58 and, after completion of the movement of the sample stage 4, the image in the central region of the wide-field image is switched to the real-time image.

With further reference to FIG. 3 along with FIG. 1, when the same position of the touch screen 60 is contacted by a finger twice consecutively (double-tap), the control means 56 carries out focusing of the objective lens 8 with respect to the sample 2 on the sample stage 4 (autofocusing). This focusing can be performed, for example, by detecting the contrast at the position of contact with the finger and its neighborhood, and taking a necessary measure based on this contrast. If desired, it is permissible to irradiate the position of contact by the finger with a laser beam, and carry out focusing based on the contrast in the required region of the sample 2 under irradiation with the laser beam.

With further reference to FIGS. 1 and 3, when, in the illustrated embodiment, a specific gesture with a finger is used on the touch screen 60, for example, the finger is contacted with the touch screen 60 and kept there for a predetermined time or longer (touch-and-hold), then the control means 56 sets the microscope in the Raman measurement region setting mode. In this Raman measurement mode, the Raman measurement region is set in accordance with the finger gesture used on the touch screen 60. For example, the position of contact with the finger can itself be set as a Raman measurement region. Alternatively, if the contacted finger is moved, the Raman measurement region can be set in accordance with this movement. If the contacted finger is dragged, for example, a rectangular region having the initial contact position and the final position of dragging as the end points of a diagonal line can be set as a measurement region. If the end of the displayed real-time image is reached, or this end is exceeded, during the drag, it is possible to switch the image to the aforementioned wide-field buffer image and, while updating the wide-field buffer image, move the image, thereby setting a wider region than the field of view of the objective lens of the lowest magnification as a measurement region. Alternatively, if the finger is moved so as to surround the required region, the surrounded required region can be set as a Raman measurement region.

Figure 8:
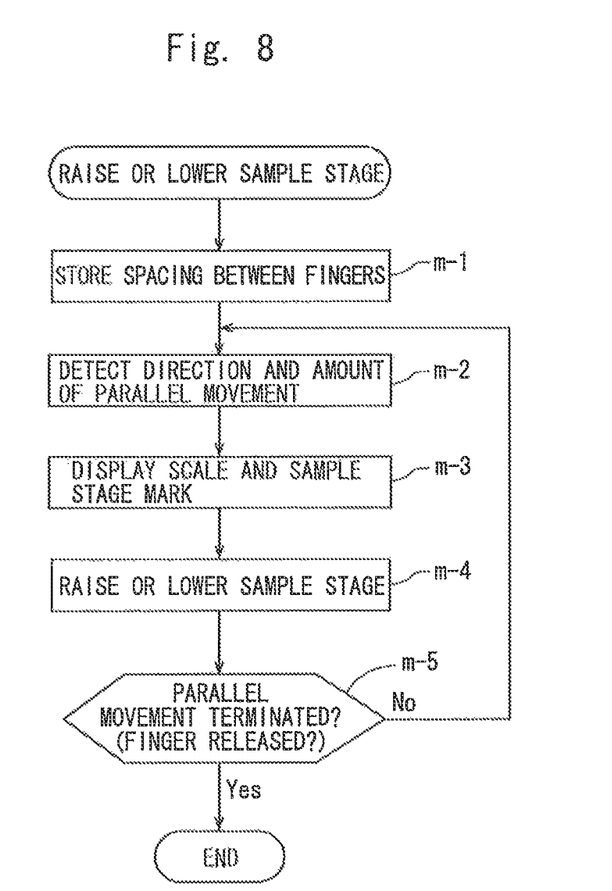
FIG. 8 is a flowchart showing the manner of elevating or lowering the sample stage in the microscope illustrated in FIG. 1.
Figure 11:
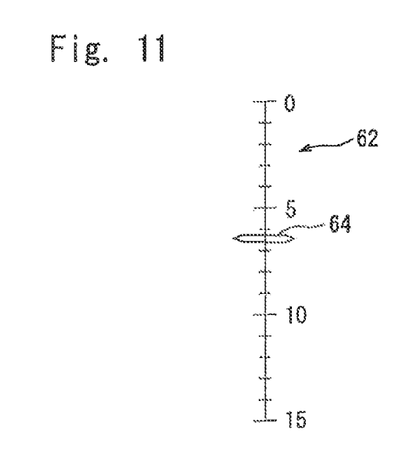
FIG. 11 is a schematic view showing a scale and a sample stage mark showing the ascent or descent position of the sample stage.

The manner of raising or lowering the sample stage will be explained by reference to FIG. 8. In step m-1, spacing between two fingers contacted with the touch screen 60 is stored. Then, the program shifts to step m-2 and, if the two fingers are moved, with the spacing between them being substantially unchanged (if the spacing between the two fingers is changed, the program shifts to the step x-2 shown in FIG. 5), the direction of movement (upward or downward) and the amount of movement are detected. Then, the program shifts to step m-3 to display a scale 62 and a sample stage mark 64, as shown in FIG. 11, in a side part, for example, of the display means 58 for a predetermined time. The sample stage mark 64 represents the vertical position of the sample stage 4, and the scale 62 represents the vertical spacing between the revolver 10 and the sample stage 4. Then, in step m-4, the driving means 6 is allowed to act in accordance with the parallel movement of the two fingers to raise or lower the sample stage 4. In more detail, if the two fingers are moved parallel in a predetermined direction, namely upward, the sample stage 4 is raised; if the two fingers are moved parallel in the opposite direction, namely downward, the sample stage 4 is lowered. The vertical position of the sample stage 4 is detected by a suitable detecting means (not shown), and the sample stage mark 64 is raised or lowered along the scale 62 in accordance with the ascent or descent of the sample stage 4. Then, the program shifts to step m-5 to determine whether the parallel movement of the two fingers has been terminated and the two fingers have been released from the touch screen 60. If the parallel movement has not been terminated, the program returns to the above step m-2. In a state where the scale 62 and the sample stage mark 64 are displayed in the display means 58, a finger is contacted with the sample stage mark 64 and the sample stage mark 64 is raised or lowered, whereby the sample stage 4 can be raised or lowered.

As described above, the touch screen 60 and the control means 56 can be connected together wirelessly. In this case, if the revolver 10 and the sample stage 4 are close to each other beyond a predetermined distance when wireless connection is cut against the user's intention, the control means 56 desirably lowers the sample stage 4 automatically to separate the sample stage 4 from the revolver 10 by the predetermined distance, thereby ensuring safety. If the laser light source 14 is energized, it is desirably deenergized.

EXPLANATIONS OF LETTERS OR NUMERALS

2: Sample
4: Sample stage
6: Driving means (X-/Y-directionally driving means, Z-directionally driving means)
8: Objective lens
10: Revolver
12: Revolver driving means
54: Image pickup means
56: Control means
58: Display means
60: Touch screen

The invention claimed is:
1. A microscope comprising:
a sample stage;
a revolver including a plurality of objective lenses having different magnifications;
a revolver driver for positioning any one of the plurality of objective lenses selectively at a working position opposing the sample stage;
a state driver for moving the sample stare in the X-direction, the Y-direction, and the Z-direction, the stage driver moving the sample stage and the revolver relatively in the Z-direction;
an image pickup means;
an optical projector for projecting an image of a sample located on the sample stage onto the image pickup means through the objective lens positioned at the working position;
a display;
a touch screen disposed on a display surface of the display; and
a controller responsive to finger contact on the touch screen for controlling the stage driver, the revolver driver, and a display magnification of the display, wherein
when a finger contacts the touch screen, the controller stores an image signal from the image pickup means into a built-in memory, and allows a memory image based on the stored image signal to be displayed on the display surface of the display, and
when the finger moves without being released from the touch screen, the controller moves the memory image on the display surface of the display in accordance with movement of the finger, and allows the stage driver to act to move the sample stage in the X- and/or Y-direction, and wherein
during a period from contact of the finger with the touch screen until release of the finger from the touch screen, the controller detects the movement of the finger at predetermined time intervals to update the memory image based on positions of the finger, and
when the movement of the finger stops, and the finger releases from the touch screen, to terminate movement of the sample stage, then the controller renders the image displayed on the display surface of the display a real-time image projected onto the image pickup means.

2. A microscope comprising:
a sample stage;
a revolver including a plurality of objective lenses having different magnifications;
a revolver driver for positioning any one of the plurality of objective lenses selectively at a working position opposing the sample stage;
a state driver for moving the sample stage in the X-direction the Y-direction, and the Z-direction, the stage driver moving the sample stage and the revolver relatively in the Z-direction;
an image pickup means;
an optical projector for projecting an image of a sample located on the sample stage onto the image pickup means through the objective lens positioned at the working position;
a display;
a touch screen disposed on a display surface of the display; and
a controller responsive to finger contact on the touch screen for controlling the stage driver, the revolver driver, and a display magnification of the display, wherein
upon simultaneous contact of two fingers with the touch screen, the controller stores spacing between the two fingers; and when the spacing between the two fingers is changed without release of the two fingers from the touch screen, the controller changes a magnification of the image displayed on the display surface of the display in accordance with a change rate of the spacing between the two fingers, and wherein when the change rate of the spacing between the two fingers exceeds a predetermined threshold value, the controller allows the revolver driver to act, thereby replacing the objective lens located at the working position opposing the sample stage.

3. The microscope according to claim 2, wherein in starting the action of the revolver driver, the controller stores an image signal from the image pickup means into the built-in memory; and during the action of the revolver driver, the controller allows a memory image based on the image signal stored in the built-in memory to be displayed on the display surface of the display at a magnification conforming to the change rate for the two fingers.

4. The microscope according to claim 2, wherein upon termination of replacement of the objective lens, the controller allows the stage driver to act, for adjustment of focus, based on information on a parfocal distance for the objective lens and a position of a center of a field of view prestored in the built-in memory; and then the controller renders the image displayed on the display surface of the display a real-time image projected onto the image pickup means.

5. A microscope, comprising:

a sample stage;

a revolver including a plurality of objective lenses having different magnifications;

a revolver driver for positioning any one of the plurality of objective lenses selectively at a working position opposing the sample stage;

a stage driver for moving the sample stage in the X-direction, the Y-direction, and the Z-direction, the stage driver moving the sample stage and the revolver relatively in the Z-direction;

an image pickup means;

an optical projector for projecting an image of a sample located on the sample stage onto the image pickup means through the objective lens positioned at the working position;

a display;

a touch screen disposed on a display surface of the display; and a controller responsive to finger contact on the touch screen for controlling the stage driver, the revolver driver, and a display magnification of the display, wherein when an image displayed on the display surface of the display is reduced after the objective lens of the lowest magnification is located at the working position, the controller permits display of a wide-field buffer image composed of a real-time image on the display surface of the display and an additional image added in succession to the real-time image in a region outward of the real-time image.

6. The microscope according to claim 5, wherein when the additional image is not stored in the built-in memory, the controller allows the stage driver to act, thereby moving the sample stage in the X- and Y-direction to store a required additional image signal into the built-in memory, and then returning the sample stage to an initial position.

7. The microscope according to claim 5, wherein upon contact of a finger with the touch screen, with the wide-field buffer image being displayed on the display surface of the display, the controller stores the wide-field buffer image signal into the built-in memory; and when the finger is moved without being released from the touch screen, the controller moves the wide-field buffer image on the display surface of the display in accordance with movement of the finger, and allows the stage driver to act, thereby moving the sample stage in the X- and/or Y-direction.

8. A microscope comprising:

a sample stage;

a revolver including a plurality of objective lenses having different magnifications;

a revolver driver for positioning any one of the plurality of objective lenses selectively at a working position opposing the sample stage;

a stage driver for moving the sample stage in the X-direction, the Y-direction, and the Z-direction, the stage driver moving the sample stage and the revolver relatively in the Z-direction;

an image pickup means;

an optical projector for projecting an image of a sample located on the sample stage onto the image pickup means through the objective lens positioned at the working position;

a display;

a touch screen disposed on a display surface of the display; and a controller responsive to finger contact on the touch screen for controlling the stage driver, the revolver driver, and a display magnification of the display, wherein the microscope is a Raman microscope; and when a specific gesture of the operator's finger is used on the touch screen, the controller sets the microscope in a Raman measurement region setting mode, and wherein the specific gesture is to contact the finger with the touch screen and maintain contact of the finger for a predetermined time; and the controller sets a site of contact by the finger as a measurement region.

9. A microscope comprising:

a sample stage;

a revolver including a plurality of objective lenses having different magnifications;

a revolver driver for positioning any one of the plurality of objective lenses selectively at a working position opposing the sample stage;

a stage driver for moving the sample stage in the X-direction, the Y-direction, and the Z-direction, the stage driver moving the sample stage and the revolver relatively in the Z-direction;

an image pickup means;

an optical projector for projecting an image of a sample located on the sample stage onto the image pickup means through the objective lens positioned at the working position;

a display;

a touch screen disposed on a display surface of the display; and a controller responsive to finger contact on the touch screen for controlling the stage driver, the revolver driver, and a display magnification of the display, wherein the microscope is a Raman microscope; and when a specific gesture of the operator's finger is used on the touch screen, the controller sets the microscope in a Raman measurement region setting mode, and wherein when, after setting in the measurement region setting mode, the finger in contact with the touch screen is moved without being released from the touch screen, the controller sets a measurement region in accordance with movement of the finger.

10. A microscope, comprising:

a sample stage;

a revolver including a plurality of objective lenses having different magnifications;

a revolver driver for positioning any one of the plurality of objective lenses selectively at a working position opposing the sample stage;

a stage driver for moving the sample stage in the X-direction, the Y-direction, and the Z-direction, the stage driver moving the sample stage and the revolver relatively in the Z-direction;

an image pickup means;

an optical projector for projecting an image of a sample located on the sample stage onto the image pickup means through the objective lens positioned at the working position;

a display;

a touch screen disposed on a display surface of the display; and a controller responsive to finger contact on the touch screen for controlling the stage driver, the revolver driver, and a display magnification of the display, wherein when two fingers are simultaneously contacted with the touch screen, and moved in parallel without being released from the touch screen, the controller allows the stage driver to act in accordance with an amount of parallel movement of the two fingers, thereby moving the sample stage relative to the revolver in the Z-direction.

11. The microscope according to claim 10, wherein when the two fingers are moved in parallel in a predetermined direction, the controller moves the sample stage relatively toward the revolver; and when the two fingers are moved in parallel in an opposite direction, the controller moves the sample stage away from the revolver.

12. The microscope according to claim 10, wherein when the two fingers are simultaneously contacted with the touch screen, and moved in parallel without being released from the touch screen, the controller displays on the display a scale and a sample stage mark for showing a relative position of the sample stage with respect to the revolver, and moves the sample stage mark along the scale in accordance with relative movement of the sample stage with respect to the revolver.

13. The microscope according to claim 10, wherein the scale and the sample stage mark are displayed for a predetermined period of time and, when a finger is contacted with the sample stage mark and moved along the scale during display of the scale and the sample stage mark, the sample stage is moved relative to the revolver in accordance with movement of the finger.

14. A microscope, comprising:

a sample stage;

a revolver including a plurality of objective lenses having different magnifications;

a revolver driver for positioning any one of the plurality of objective lenses selectively at a working position opposing the sample stage;

a stage driver for moving the sample stage in the X-direction, the Y-direction, and the Z-direction, the stage driver moving the sample stage and the revolver relatively in the Z-direction;

an image pickup means;

an optical projector for projecting an image of a sample located on the sample stage onto the image pickup means through the objective lens positioned at the working position;

a display;

a touch screen disposed on a display surface of the display; and a controller wirelessly connectable to the touch screen and responsive to finger contact on the touch screen for controlling the stage driver, the revolver driver, and a display magnification of the display, wherein while the touch screen is in wireless connection to the controller, if the sample stage approaches the revolver beyond a predetermined distance and the wireless connection is cut, the controller allows the Z-directionally driving means stage driver to act, thereby moving the sample stage relatively to a position separated from the revolver by the predetermined distance.

15. A microscope of claim 1, comprising:

a sample stage;

a revolver including a plurality of objective lenses having different magnifications;

a revolver driver for positioning any one of the plurality of objective lenses selectively at a working position opposing the sample stage;

a stage driver for moving the sample stage in the X-direction, the Y-direction, and the Z-direction, the stage driver moving the sample stage and the revolver relatively in the Z-direction;

an image pickup means;

an optical projector for projecting an image of a sample located on the sample stage onto the image pickup means through the objective lens positioned at the working position;

a display;

a touch screen disposed on a display surface of the display; and a controller wirelessly connectable to the touch screen and responsive to finger contact on the touch screen for controlling the stage driver, the revolver driver, and a display magnification of the display, wherein the microscope is provided with a laser light source; and while the touch screen is in wireless connection to the control means controller, if the laser light source is energized and the wireless connection is cut, the control means controller deenergizes the laser light source.

* * * * *